United States Patent [19]
Radford

[11] 3,971,722
[45] July 27, 1976

[54] FILTER ELEMENTS

[76] Inventor: Colin Michael Radford, 14 Sandown Mews, Rivonia Road, Sandown, Sandton, Transvaal, South Africa

[22] Filed: Jan. 17, 1975

[21] Appl. No.: 542,047

[30] Foreign Application Priority Data
July 17, 1974 South Africa............................ 4561

[52] U.S. Cl................................ 210/486; 210/489
[51] Int. Cl.² .......................................... B01D 39/00
[58] Field of Search .......... 210/331, 345, 455, 486, 210/488, 498, 487, 489, 232, 346, 347

[56] References Cited
UNITED STATES PATENTS

| | | | |
|---|---|---|---|
| 3,193,105 | 7/1965 | Putnam | 210/486 |
| 3,438,505 | 4/1969 | Luthi | 210/498 |
| 3,481,479 | 12/1969 | Hoskins et al. | 210/486 |
| 3,610,419 | 10/1971 | Vallee et al. | 210/486 |
| 3,643,803 | 2/1972 | Glos | 210/486 |
| 3,679,061 | 7/1972 | Davis | 210/486 |
| 3,730,353 | 5/1973 | Trasen et al. | 210/486 |

Primary Examiner—Charles N. Hart
Assistant Examiner—Ernest G. Therkorn
Attorney, Agent, or Firm—Cushman, Darby & Cushman

[57] ABSTRACT

A filter element primarily for disc filters and comprising a pair of moulded panels secured together in parallel relationship so as to define between them a cavity, each panel having on its outer surface a series of outstanding spaced parallel supporting ribs, drainage perforations through the panels between the ribs thereon, and a drainage outlet from the cavity between the panels.

9 Claims, 5 Drawing Figures

FILTER ELEMENTS

This invention relates to filter elements, and more particularly to filter elements having a generally planar configuration such as, for example, disc filter elements.

Filter elements of a planar configuration generally comprise a frame having support means secured thereover for a filter bag which, in use, encloses the frame and support. Such frame and support assemblies are generally fairly costly to manufacture or, do not provide sufficiently large flow paths to provide for optimal flow conditions within the element. Another construction which comprises simply a sheet-like web of material having upstanding ridges thereon to act as a support for a filter cloth, also suffers to some extent from these disadvantages.

It is the object of this invention to provide a filter element of the above type which is at least simpler to manufacture than many prior art elements, but which also provides to free flow of liquids within the covering filter medium.

In accordance with the invention there is provided a filter element comprising a pair of moulded panels secured together to define an internal cavity, spaced supporting ribs on the outer surfaces of the panels, drainage perforations through said panels between the ribs and communicating with the cavity and a drainage outlet from said cavity.

Further features of the invention provide for the two panels to each have an integral surrounding ridge with the ridges secured together to hold the panels in spaced relationship, for the panels to be additionally secured together by means of spaced lugs extending inwardly into the cavity, and for the two panels to be of identical shape and configuration.

Still further features of the invention will become apparent from the following description of one embodiment thereof. In this description reference will be made to the accompanying drawings in which.

Figure 1:
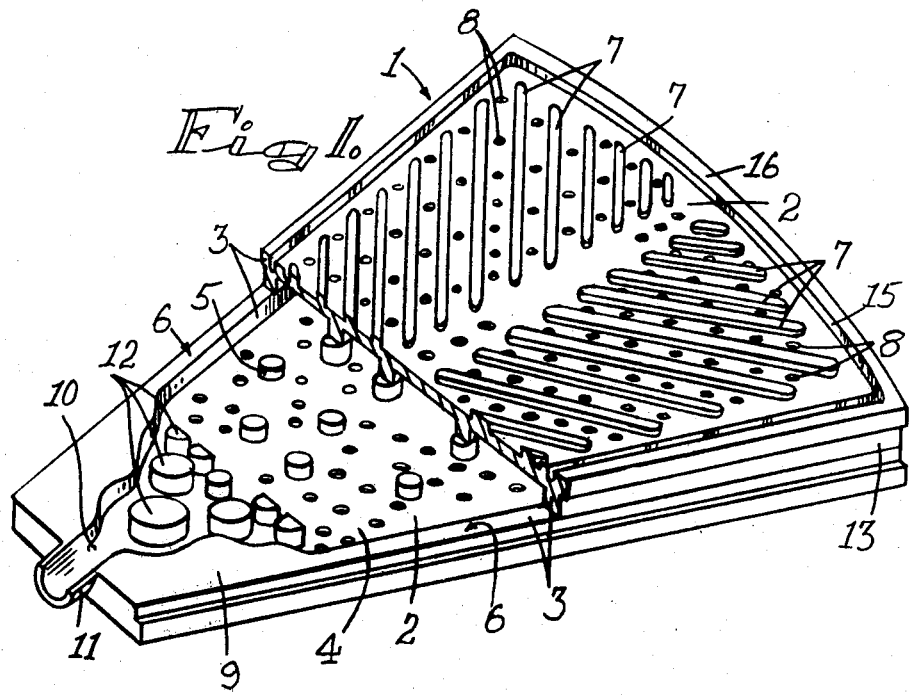
FIG. 1 is a partly broken isometric view of a disc filter element.

In this embodiment of the invention a disc filter element 1 of conventional planar configuration is shaped as a truncated sector of a circle. The element comprises two identical moulded panels 2 secured together by means of a suitable bonding agent which will depend on the material from which the panels are made. Of course, any other means of securing the panels together may be used such as mechanical means for instance, screws or nuts and bolts, but bonding is generally preferred. However, welding would be equally acceptable if it is possible.

Each panel has a surrounding ridge 3 with the ridges actually being bonded together to provide a cavity 4 between the panels. The panels also have lugs 5 on their inside surfaces with the free ends of the lugs being co-planar with the upper surface 6 of the ridges. These lugs are also bonded together when the panels are joined so that in use they maintain the panels in their correct spaced relationship whether a negative or positive pressure is applied to the interior of the cavity.

The panels are provided, in this particular embodiment, on their outer faces with two series of parallel spaced ribs 7 each series being arranged on one side of the median radial line which divides the sector in half. The channels formed between the ridges are provided with series of perforations 8 communicating with the cavity.

Figure 4:
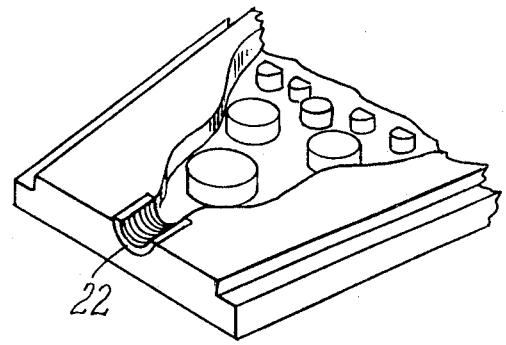
FIG. 4 illustrates an alternative outlet from the element.

At the narrow end 9 of the element the cavity is curved smoothly to a drainage outlet 10. The outlet itself may be defined by two semi-cylindrical tubular extensions 11 one of which is moulded integral with each of the panels. The extensions are arranged such that when the two panels are secured together a tubular connector pipe is formed, which is suitable for direct connection to the filter. Alternatively, as shown in FIG. 4, semi-cylindrical screw threaded inserts 22 may be moulded into the panels at the outlet so as to form a screw threaded socket when the two panels are secured together. An outlet tube having complementary screw threads may then be fitted to the socket. Furthermore, if required, the screw threads carried by the inserts could simply be moulded into the outlet, thereby avoiding the use of inserts which are in general costly.

In the region adjacent the drainage outlet where the cavity narrows, is a series of baffles 12 of different shapes and sizes located to prevent direct blow-back of filtrate into the cavity during the blow-off cycle during filtration, and also to diffuse the blow-off and spread it within the cavity. These baffles accept the wear from any abrasive particles present in the filtrate, thereby protecting the interior of the cavity itself.

Finally the panels are shaped to provide a groove 13 down each of the radially extending sides of the filter elements in order to fit into existing frames therefor where this is necessary. The presence or absence of these grooves will depend upon the construction of the filter with which the element is to be used.

Two alternative methods of fitting a filter medium in the form of a sheet of filter material over the faces of the panels are considered to be particularly suitable.

Figure 2:
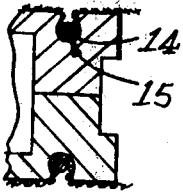
FIGS. 2 and 3 are cross-sectional views through the outer edge of the panel showing two alternative forms of securing filter media thereto.

The first, shown clearly in FIG. 2, is to locate independent sheets of filter material over each face and secure them in position by a caulking strip 14 forced into a caulking groove 15 around the periphery of the panel faces.

Figure 3:
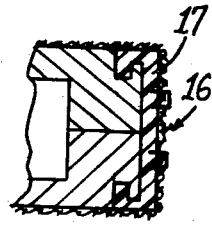

Alternatively a bag may be fitted over the element and secured to the outer peripheral edge 16 by means of staples. In order to facilitate this and protect the element, a disposable strip 17 of plastics material may be releasably secured to the element to act as a staple receiving pad. A type of double rebate arrangement is illustrated In FIG. 3 for holding the pad in position but any other suitable arrangement can be used.

In use, the channels provide for drainage of filtrate between the ribs 7, the filtrate passing from there into the cavity. Substantially unobstructed flow is then provided through the cavity to the outlet.

This construction of the filter element allows it to be easily and swiftly constructed with a consequent saving in cost. Also, the lugs enable the panels to be made of a softer and thus more abrasion resistant material such as a highly resistant grade of polyurethane since the lugs prevent collapse and/or bulging of the panels during the suction and blow-off cycles respectively. However, where required, the panels can be made of harder material and the lugs omitted. A preferred panel has been made of polyurethane having a Shore Hardness of about 90 and wherein the lugs were present. It is considered however that effective panels will also be made of suitable rubbers or the like.

Figure 5:
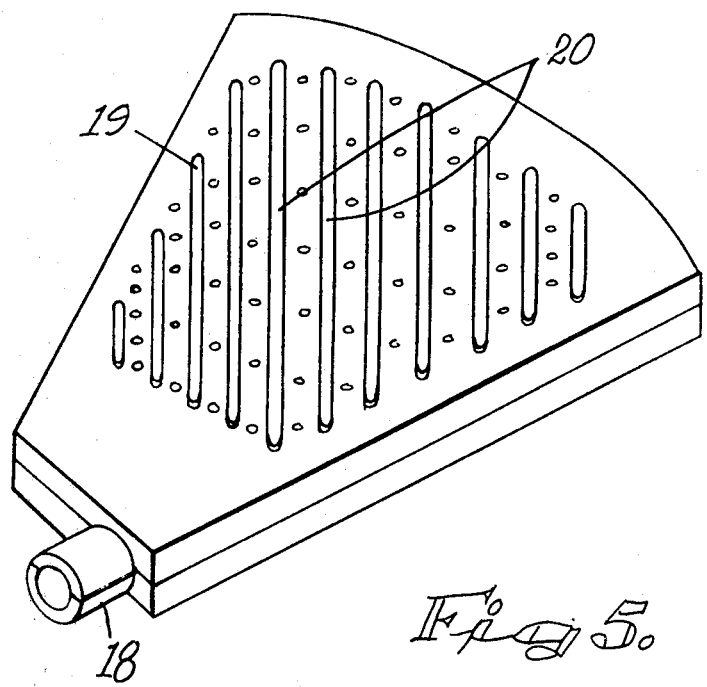
FIG. 5 is an isometric view of an alternative application of the invention.

The invention is not confined in its application to the specific type of disc filter element described above. Thus it could also be applied, for example, to the so-called "leading edge disc filter sector" illustrated in FIG. 5. In this case the outlet pipe 18 is parallel to one radial edge of the sector 19 and in this case there is only one series of ridges 20 which extend in the general direction towards the outlet.

Thus the invention may be varied widely without departing from the scope thereof, which is limited only by the structure of the panels.

What I claim as new and desire to secure by letters patent is:

1. A filter element comprising a pair of moulded panels secured together to define an internal cavity, a plurality of radially spaced, generally laterally extending supporting ribs on the outer surfaces of the panels, a plurality of drainage perforations between each of a plurality of radially adjacent twos of the ribs and communicating with the cavity and a drainage outlet from said cavity.

2. A filter element as claimed in claim 1 in which the two panels each have an integral surrounding ridge forming the boundary of the cavity and ridge with the two ridges being secured together to hold the panels in spaced relationship.

3. A filter element as claimed in claim 2 in which the panels are secured together additionally by means of a plurality of individual, spaced lugs extending inwardly into the cavity without compartmentalizing the cavity.

4. A filter element as claimed in claim 1 in which the element is a disc filter element of substantially trucated sector shape.

5. A filter element as claimed in claim 4 in which the outlet from the cavity is located at the narrower end of the element and baffles are located adjacent said outlet so as to be in the path of liquid blown back during a blow-off cycle.

6. A filter element as claimed in claim 1 in which the panels are injection moulded from plastics material.

7. A filter element as claimed in claim 1 wherein each rib slopes so that at one respective lateral extreme thereof each rib lies closer to the drainage outlet than at the opposite lateral extreme thereof.

8. A filter element as claimed in claim 7 wherein filter element is a disk filter element of substantially truncated sector shape with the cavity outlet centrally located at the narrower end of the element and the ribs on each said panel outer surface are arranged in two laterally adjacent sets on such surface in a herringbone pattern.

9. A filter element as claimed in claim 7 wherein the filter element is a disk filter element of substantially truncated sector shape with the cavity outlet substantially laterally displaced toward one lateral extreme of the narrower end of the element and the ribs on each panel are arranged in a set which slopes radially inward toward said one lateral extreme of the narrower end of the element.

* * * * *